United States Patent [19]

McCord

[11] Patent Number: 4,463,975
[45] Date of Patent: Aug. 7, 1984

[54] BAND SEAL CLAMP

[75] Inventor: H. Lee McCord, Longview, Tex.

[73] Assignee: Garlock, Inc., Longview, Tex.

[21] Appl. No.: 343,315

[22] Filed: Jan. 27, 1982

[51] Int. Cl.³ .............................................. F16L 21/06
[52] U.S. Cl. .................................... 285/419; 285/420
[58] Field of Search ................ 285/419, 420, 373; 138/99

[56] References Cited

U.S. PATENT DOCUMENTS

| Re. 30,042 | 7/1979 | Hiemstra et al. | 285/419 |
| 3,905,623 | 9/1975 | Cassel | 285/382 |
| 3,944,265 | 3/1976 | Hiemstra et al. | 285/419 |
| 4,142,743 | 3/1979 | McGowen et al. | 285/177 |
| 4,165,109 | 8/1979 | Foti | 285/177 |
| 4,261,600 | 4/1981 | Cassel | 285/177 |
| 4,312,526 | 1/1982 | Cassel | 285/419 |
| 4,364,588 | 12/1982 | Thompson | 285/419 |

FOREIGN PATENT DOCUMENTS 19293 3/1956 Fed. Rep. of Germany .
705247 3/1954 United Kingdom .

Primary Examiner—Thomas F. Callaghan
Attorney, Agent, or Firm—Woodcock, Washburn, Kurtz, Mackiewicz & Norris

[57] ABSTRACT

An improved band seal clamp for clamping cylindrical members, for example, automotive or truck exhaust systems, is disclosed which features clamping bars at each end of the band. Upon tightening of bolts, at least one end of the band is wrapped up about an axis outside of and parallel to the axis of the tube, so as to tighten the band clamp.

6 Claims, 6 Drawing Figures

BAND SEAL CLAMP

FIELD OF THE INVENTION

This invention relates to the field of clamps for joining cylindrical members together. More particularly, the invention relates to a clamp of the type in which a flat, band-like strip of metal is wound around a joint between cylindrical members, such as tubes in an automotive or truck exhaust system and joined at its ends to form a strong, leakproof joint.

BACKGROUND OF THE INVENTION

The problem of provision of a strong leak-proof joint between tubular or cylindrical members has been of interest for many years. There are numerous features which are desirable in such a clamp, in addition to the obvious requirements that the joint be leak-proof and durable in service. A satisfactory clamp must also be simple of installation, inexpensive to manufacture, provide structural strength to the joint, particularly to butt joints, in which the ends of the cylindrical members abut one another rather than one telescoping inside another, as in a lap joint configuration, and must be capable of installation in a "band-aid" fashion, that is, without separating the two tubes from one another.

The prior art shows numerous attempts to achieve all these goals. See, for example, U.S. Pat. Nos. 3,905,623 and 4,261,600 to Cassel in both of which the ends of the band are contacted by opposed shaped clamping members disposed on opposite sides of a channel formed in the band. A central shaping member is disposed within the channel, so that upon tightening of bolts extending through the two outer shaping members, the channel formed by the band and the inner shaping member, the metal of the band is deformed and constrained to stretch into close contact with the shaping members, thus tightening the band around the tube. However, these clamps suffer from the distinct disadvantage that they are difficult to assemble in the field, as they require numerous parts to be lined up with one another so that the bolts can be thrust through corresponding holes. Furthermore, provision of the plural shaping members is costly. A somewhat similar design with some of the same disadvantages is shown in commonly assigned copending application, Ser. No. 205,639 filed Nov. 10, 1980, now U.S. Pat. No. 4,364,588, and another similar approach is shown in U.S. Pat. No. 4,165,109 to Foti.

A somewhat different approach is shown in U.S. Pat. No. 4,142,743 to McGowan et al. There a flat band of metal having flat clamping bars welded to its ends is assembled around the tube. The spacing of the holes in the ends of the band with respect to the diameter of the tube is such that the clamping bars do not meet until the bolts are tightened, thus causing the band to be stretched into conformity with the outer surfaces of the tubes to be coupled. This clamp is not without utility, but it is sometimes difficult to assemble due to the close fit of the bolts within their holes necessary in order to insure proper assembly. A somewhat similar approach is shown also in U.S. Pat. No. 3,944,265 to Hiemstra et al, reissued as U.S. Pat. No. Re. 30,042. Both the Hiemstra et al patents and the McGowan patent suffer from the deficiency that the spacing of the holes in the end of the band must be very carefully controlled in order that the clamping bars can meet one another squarely and completely upon tightening of the clamp without overtightening of the bolts or undertensioning of the band, which is important in order that a strong and rigid joint can be made. Stated somewhat differently, in order that a strong and rigid joint can be formed, it is essential that a substantially uniform compressional force be exerted all the way around the joint. According to the Heimstra and McGowan designs, this is only possible when the two clamping bars are pulled up close together by the tightening of the bolts. This can only occur when the hole spacing and the pipe sizes are very closely controlled with respect to one another. Otherwise, in the case where the tube is comparatively too large for the bolt hole spacing in the band, the bars will not meet, causing leakage, while if the band hole spacing is too great, the faces of the clamping bars will meet without sufficient stress being exerted on the band, thus resulting in a leaky joint. McGowan et al and Hiemstra et al both recognize this problem and provide a separate compressible, resilient sealing member to prevent leakage in the vicinity of the joint.

Accordingly, there remains a need of the industry for an improved band seal clamp.

OBJECTS OF THE INVENTION

It is an object of the invention to provide an improved band seal clamp.

Another object of the invention is to provide a band seal clamp which provides a strong, rigid, leak-proof joint.

Another object of the invention is to provide a band seal clamp which can be assembled in the band-aid fashion without requiring disassembly of tubular members to be joined and which has a minimum number of loose parts which must be assembled by a mechanic seeking to install the clamp.

A further object of the invention is to provide a clamp in which an adequately strong joint can be made without requiring unduly strict dimensional tolerances, or strict control of assembly procedures.

SUMMARY OF THE INVENTION

The above needs of the art and objects of the invention are satisfied by the present invention which comprises a band seal clamp having cam shaped clamping members adapted to coact with one another to "wind up" one end of the band about an axis external to the tubular members being clamped. In this way the bolts causing the winding up can be tightened until an adequate degree of tightness is reached without necessarily having to stop at a specified point due to, e.g., the clamping members closely abutting one another and preventing further tightening. The cam members are shaped to fit the tube closely, so that a uniform compressional force is exerted. Furthermore, the work done by tightening of the bolts is directed entirely toward tightening of the band, by avoiding a design in which the band is tightened by deformation into conformance with a shaping member.

BRIEF DESCRIPTION OF THE DRAWINGS

The invention will be better understood if reference is made to the accompanying drawings, in which:

FIGS. 5A and 5B, shows how the clamp moves from the assembled but unclamped position to the tightly clamped position upon tightening of the clamping bolts.

DESCRIPTION OF THE PREFERRED EMBODIMENTS

Figure 1:
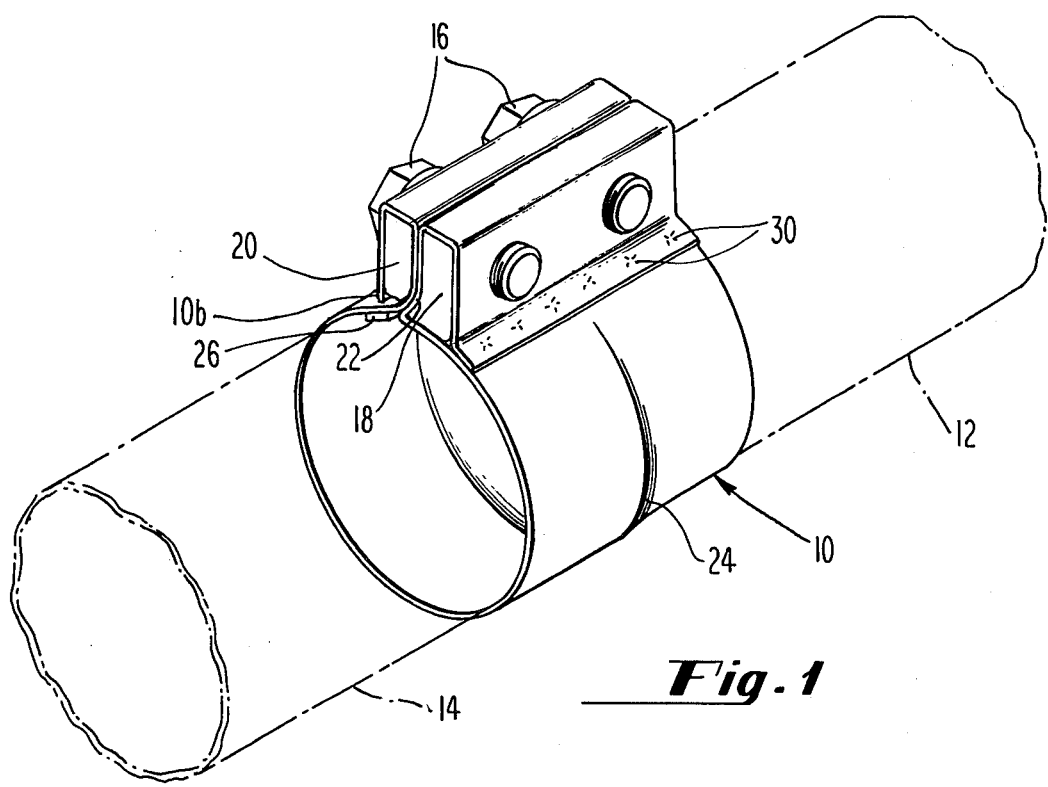
FIG. 1 shows a perspective view of the clamp of the invention assembled over a joint to be clamped.

FIG. 1 shows a perspective view of the clamp 10 according to the invention surrounding two tubular members 12 and 14, for example, two pieces of tubing in a truck exhaust system. The ends of the band clamp 10 are clamped together by bolts 16. One end of the clamp 10 is formed to surround a first force bar 18 and the second around a second differently shaped, cooperating force bar 20. The cooperating shape is a rounded interface indicated generally at 22. The bolts 16 pass through slots in the second shaped member 20 and into threaded holes in the first shaping member 18. Upon exertion of an unbalanced force on the second shaping member 20 by tightening of the bolts as will be explained below, the second shaping member rotates upwardly along the interface 22, eventually reaching the position shown in FIG. 1. The end of the band clamp and the second shaping member 20 are effectively rotated about an axis outside the tubular members 12 and 14 thus tightening the clamp.

It will be appreciated by those skilled in the art that it is desirable that a clamp be provided for lap joints in which telescoping tubes are assembled one within the other as well as butt joints in which the ends of the tubes of equal diameter are in abutting relationship. Clearly in the lap joint situation, one end of the clamp must have a larger diameter after tightening than the other, if the joint is to be strong and tight. The prior art recognizes that it is possible to make clamps with preformed steps allowing for such differences in diameter, as in Foti U.S. Pat. No. 4,165,109, or to make a uniform band and simply tighten it into close conformance with sections of tubing having different diameters in a lap joint, as in the Hiemstra reissue patent 30,042 or McGowan U.S. Pat. No. 4,142,743. According to the present invention, it is preferred that the step 24 which accommodates the differing diameters of a lap joint be preformed into the band prior to assembly around the pipe, although the specific clamp design which is the subject of the present invention is not so limited and would have utility in band clamps both with and without such preformed step-like deformation.

Figure 2:
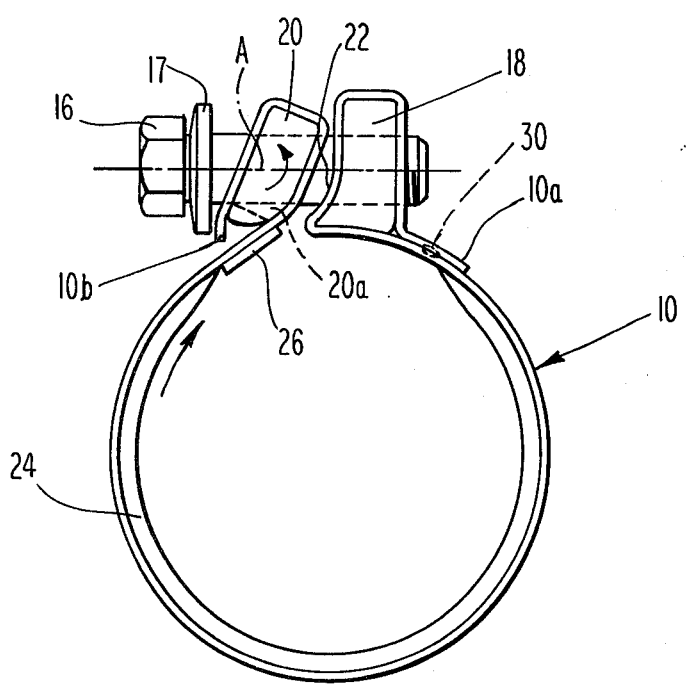
FIG. 2 shows an end view of the clamp of the invention.

FIG. 2 shows an end view of the clamp of the invention. It will be noted that one end 10a of the band 10 is wrapped around the first shaped force bar 18. Typically the band is welded as indicated at 30 perhaps at plural locations along the overlapping area of the band 10 in order to retain the force bar 18. In this connection it is noted that for purposes of ease of assembly it is desirable that no loose force bars or other parts be provided. To this end, the bolt 16 may desirably be provided with a captured washer 17 so that this assembly is reliably premade. Similarly, the second force bar 20 may be captured by the spring action of a folded over, loop-like end of the band 10 as shown, or could be held by spot welds, as in the case of the first force bar 18. The end configuration shown in FIG. 2 is preferred, as it may comprise an additional end portion 10b which serves, as the clamp is tightened, to apply pressure to the underlying portion of the band 10 thus tending to force the band into closer sealing association with the underlying tubular member. As will be apparent from the drawing, when the clamp of the invention is first assembled around a pipe, or pipes, the force exerted on the force bar 20 upon tightening of the bolt is unbalanced. This unbalanced force, together with the shape of force bar 20, cooperating with the shape of the surface 22 formed by the portion of the band 10 overlying the first force bar 18, so acts that upon tightening of the bolt 16, the band 10 tends to be "wrapped up" about an axis indicated generally at A, in a direction indicated by an arrow, thus tightening the band seal clamp of the invention by moving the end of the band carrying force bar 20 with respect to that carrying force bar 18, as indicated in the drawing by another arrow. In order that wrapping-up of the end of the band (i.e., rotation of the force bar 20 with respect to bolt(s) 16) can take place it is essential that the exit cross-section of the apertures 20a through which bolts 16 pass (i.e. the cross-section of each aperture 20a which abuts the interface 22) be formed oval, to permit relative motion of that side of the bar 20 with respect to the bolt 16.

The unbalanced force is due to the force bar 20 being at an angle to the washer 17 which actually transmits the clamping force from the bolt 16 to the force bar. Alternatively the washer 17 could be eliminated, so that the bolt 16 would directly exert the unbalanced force on the force bar 20. It will be appreciated that the operative principle is that the reaction surface on the force bar (that surface against which the clamping force is exerted) be disposed at an angle other than the perpendicular to the direction of motion of the clamping means—e.g., to the axis of the bolt. In this way the unbalanced force, causing the winding-up of the force bar and tightening of the clamp is effectuated.

Figure 3:
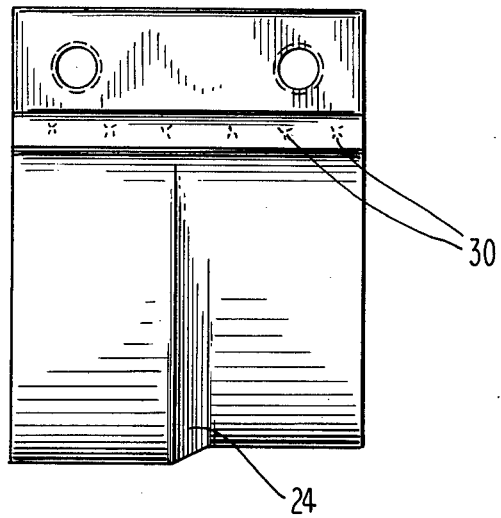
FIGS. 3. and 4 show elevation views of alternate embodiments of the clamp of the invention.
Figure 4:
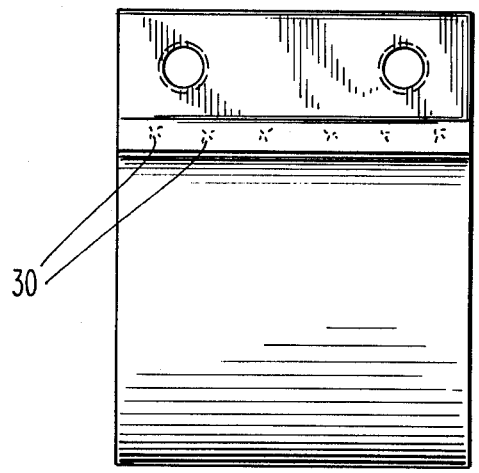

As noted above, the clamp of the invention in its preferred embodiment will be manufactured both with a preformed step 24 to accommodate telescoped tubes of slightly differing diameters and without such a step 24 for clamping butt jointed tubes of the same diameter. FIGS. 3 and 4 are elevation views of the clamp of the invention showing the different configurations. The shape or step 24 preformed into the lap joint type tube of FIG. 3 can be formed by pressing the clamp down over an enlarged mandrel or simply by rolling the "wrinkle" 24 into the band prior to assembly with the force bars 18 and 20. FIGS. 3 and 4 also show possible locations of spot welds 30 for retaining the force bars in the end of the band 10. As shown in FIG. 3 the two halves of the clamp defined by wrinkle 24 need not be concentric; FIG. 2 shows a possible location of a strip of resilient material 26 which may in these cases be desirably attached to the band 10 to insure against leakage in the vicinity of the joint.

Figure 5:
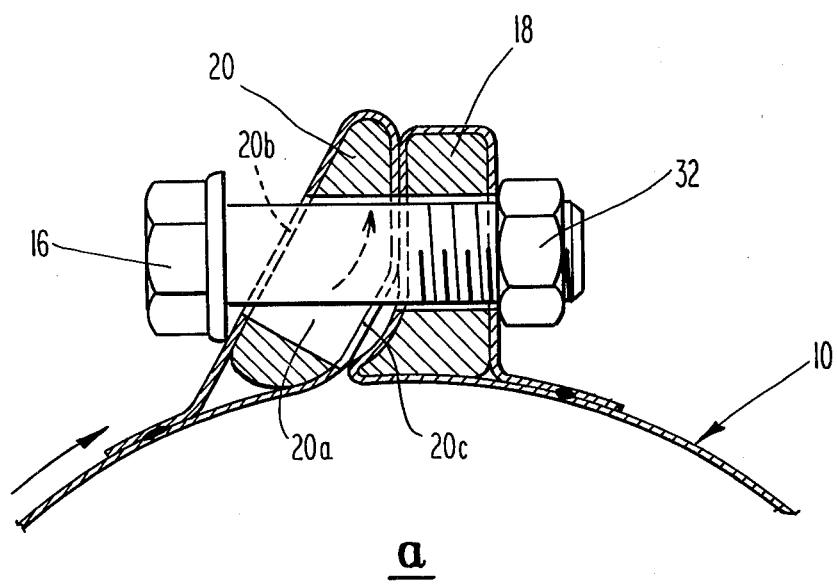
FIG. 5, comprising
Figure 5:
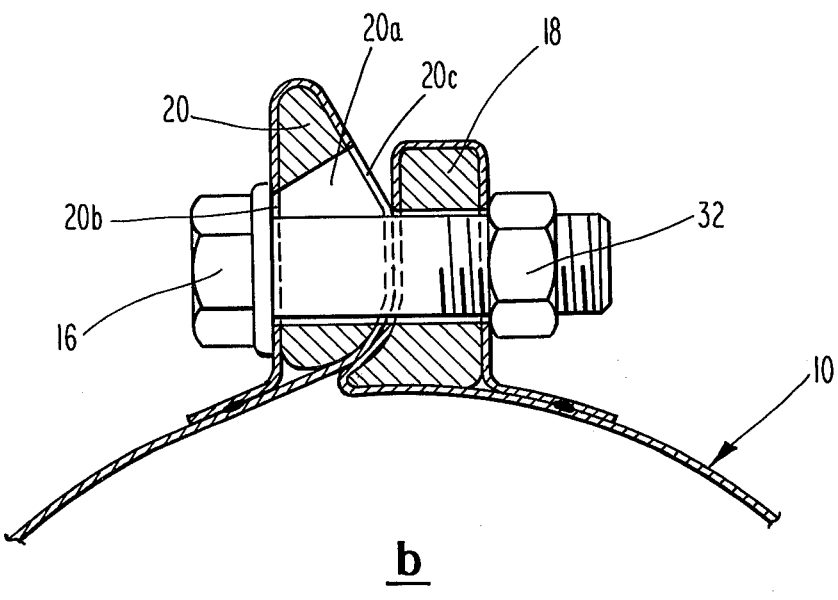

FIG. 5, comprising FIGS. 5A and 5B, shows the clamp in its assembled but untightened and tightened configurations, respectively. In FIG. 5A it will be observed that the bolt 16 or an optional washer 17 (FIG. 2) contacts an axially inclined surface of the end of the band formed by wrapping the band 10 around the second force bar 20, so that when the bolt is tightened, an unbalanced force is exerted on the second force member 20 and on the end of the band 10 causing the assembly to rotate about an axis in the direction indicated by the arrow. In turn, this pulls on the end of the band 10 tending to bring the two ends of the band closer together and exerting a compressive stress on the joint to be clamped. In order to allow relative motion of the end of the band 10, together with the second force shaping member 20, with respect to bolt 16, the bolt 16 fits within a bolt hole 20a of non-cylindrical cross-section. This bolt hole may have a generally circular entrance 20b, but must have an elongated or oval exit 20c as this area must move relative to the bolt 16. This opening will be referred to as a slotted opening. It will be appreciated that the ends of the band itself must be stamped with corresponding round holes and elongated slots, to mate with the differing cross-section of the holes 20a, while the shape of the holes 20a in the force bar 20 changes from an opening of circular cross-section 20b to one of oval cross-section 20c at the exit side of the bolt hole. This slotting is necessary to permit the rotation of the bar relative to the bolt about an axis external to the tubes to be clamped, which effectively winds the band around the force bar 20, tightening the clamp. FIG. 5A shows that the force bar 20 can be retained by wrapping the end of the band 10 therearound and spot welding the band end to itself. The bolt may be tightened with respect to threads formed in the force bar, as in FIG. 2, or by tightening of a nut as in FIG. 5. In a presently preferred embodiment, the force bar is die cast aluminum and a nut is captured in a recess in the bar.

FIG. 5B shows the clamped configuration of the clamp of the invention. It will be observed that the shapes of the force bars at 18 and 20 are such that upon full tightening of the bolt, they are in substantial contact with one another and with the members clamped, thus assuring a firm and full joint. However, it will also be recognized that if, for example, the bolt holes on the two ends of the band are slightly too close together, the fully clamped position shown in FIG. 5B upon exertion of substantial torque on bolts 16, might not be reached but that a joint of good mechanical strength would nevertheless result, as the curved sufaces of the force bars will exert a substantially uniform inward force on the members clamped.

In a successfully tested embodiment of the invention, a lap joint formed in a five-inch diameter diesel engine exhaust system, comprising telescoped tubes, one of flexible tubing, and one of solid, was successfully clamped using a clamp formed according to the invention having a 3" wide band formed of type 316 stainless steel affixed using a pair of 7/16" diameter bolts, tightened to approximately 50 ft.-lbs. The clamp had the configuration shown generally in FIGS. 1, 3, and 5. Repeated cycling of this clamp between the hot and cold conditions produced no noticeable leakage or other failure.

It will be appreciated that by shaping the force bars 18 and 20 so that they cooperate with one another, and by shaping the force bar 20 so that an unbalanced force is exerted thereon by tightening of the bolt upon assembly, the force bar 20 is caused to rotate, thus winding the band up about an axis, rather than, for example, compressing it into recesses formed in a central shaping bar, as shown in several of the prior art patents referred to above. Moreover, it will be recognized that the slotting of the holes in the force bar 20 is essential to achieving this result as otherwise relative rotation of the band end with respect to the axis of the bolt would not be possible. Further, it will be realized that the shape and function of the second force bar could be duplicated in the first force bar 18, which would then also rotate upon tightening of the bolts, thus eliminating the central spacing and shaping member shown in the prior art in favor of two end pieces resembling the second force bar 20 in cross-section; in particular, having the slotted apertures.

Accordingly, the above description of the invention should be construed broadly to include all that falls within the scope of the following claims.

I claim:

1. A band seal clamp for exerting a compressional force upon a cylindrical member when tightened, said clamp comprising:

a relatively wide, flat, elongated band of metal, said band having first and second ends, each of said ends being adapted to be assembled to and mate with a force bar member, the ends of said bands and the respective force bars having corresponding holes formed therein for passage therethrough of headed bolt means, at least one of said force bars having a reaction surface disposed at an angle other than the perpendicular to the axis of said bolt means, and said bars being shaped such that the outer portions of the assemblies of said force bars and the ends of said bands disposed away from said cylindrical member contact one another at initial assembly thereof, such that upon further tightening of said bolt means, an unbalanced force is exerted upon said at least one force bar by the head of said bolt causing it to rotate about an axis external to said cylindrical member to be clamped, wherein the shapes of the holes in said force bar which is rotated vary from a generally circular cross-section sized to fit said bolt means at an end for entry of said bolt means to a substantially oval cross-section at the end from which said bolt means exits, so that upon tightening of said bolt means said force bar is substantially rotated generally about an axis passing through the point at which said bolt means contacts said hole at a point on the generally circular portion of its cross-section.

2. In a clamp for the clamping of cylindrical members comprising a flat, elongated metal band extending around said members, said band having first and second ends, each of said ends being affixed to a force bar for the exertion of tension on the band, said clamp comprising at least one headed bolt member passing through orifices formed in said force bars, the orifices of at least one of the bars being formed with a cross section varying from generally circular at one end to substantially oval at the other end thereof, to permit substantial rotation of said force bar about an axis perpendicular to the axis of said at least one bolt, the head of said at least one bolt member bearing against a surface of said at least one bar not perpendicular to the axis of at least one said bolt member upon initial assembly thereof, such that upon tightening of said at least one bolt member, an unbalanced force is exerted on said bar, causing it to rotate about said axis, whereby said band is wound thereupon.

3. A band seal clamp comprising a flat, elongated band of metal, having first and second ends, and first and second force bars, said force bars being assembled to said ends, at least one of said force bars being affixed to an end of said band by being confined within a folded over loop-like end of the band, said ends and said force bars having corresponding holes formed therein for the passage of headed clamping bolt means therethrough, the holes in at least one of said force bars varying from generally round for mating with said clamping bolt means, to oval, said bar having a surface not perpendicular to the axis of said bolt means upon initial assembly thereof interacting with the head of said clamping bolt means, the assemblies of said bars and said band touching one another along their respective radially outward portions upon assembly of said clamp, so that a torque is exerted on said bar upon tightening of said clamping bolt means, whereby said bar is rotated about an axis generally defined by a point of contact between said bolt means and the round portion of the corresponding hole in the bar and said band is wound thereupon, tightening said clamp.

4. The clamp of claim 3 wherein said end of said band forming said folded over loop-like configuration further comprises an additional end portion extending beyond said force bar, to apply pressure to the underlying band upon tightening of said clamping means.

5. The clamp of claim 4 wherein said additional end portion comprises a folded end portion.

6. The clamp of claim 3 wherein said force bar is provided with a generally rounded shape upon which said band is wound upon tightening of said bolt means.

* * * * *